United States Patent
Raduenz et al.

(10) Patent No.: US 8,844,504 B2
(45) Date of Patent: Sep. 30, 2014

(54) HEAT EXCHANGER AND METHOD OF MANUFACTURING THE SAME

(75) Inventors: Dan R. Raduenz, Franklin, WI (US); Jason J. Braun, Franksville, WI (US); Steve P. Meshenky, Racine, WI (US); Thomas R. Grotophorst, Oak Creek, WI (US); Daniel E. Hornback, Davisburg, MI (US)

(73) Assignee: Modine Manufacturing Company, Racine, WI (US)

( * ) Notice: Subject to any disclaimer, the term of this patent is extended or adjusted under 35 U.S.C. 154(b) by 535 days.

(21) Appl. No.: 13/051,128

(22) Filed: Mar. 18, 2011

(65) Prior Publication Data

US 2011/0226222 A1    Sep. 22, 2011

Related U.S. Application Data

(60) Provisional application No. 61/315,055, filed on Mar. 18, 2010.

(51) Int. Cl.
| | |
|---|---|
| F02M 25/07 | (2006.01) |
| F28F 19/00 | (2006.01) |
| F28D 7/16 | (2006.01) |
| F28F 9/02 | (2006.01) |
| F28F 9/00 | (2006.01) |
| F28F 13/06 | (2006.01) |
| F28F 1/02 | (2006.01) |
| F28F 3/02 | (2006.01) |
| F28D 21/00 | (2006.01) |

(52) U.S. Cl.
CPC .............. *F28F 3/025* (2013.01); *F28F 19/002* (2013.01); *F28F 2220/00* (2013.01); *F28D 7/1684* (2013.01); *Y02T 10/121* (2013.01); *F28F 9/0265* (2013.01); *F28D 21/0003* (2013.01); *F28F 9/005* (2013.01); *F28F 13/06* (2013.01); *F28F 1/022* (2013.01); *F02M 25/0737* (2013.01)
USPC ........ 123/568.12; 165/166; 165/157; 165/41; 165/151

(58) Field of Classification Search
USPC .................... 123/568.12, 563, 41.31; 60/599; 165/41–43, 51
See application file for complete search history.

(56) References Cited

U.S. PATENT DOCUMENTS

| | | |
|---|---|---|
| 1,770,208 A | 7/1930 | Kemnal |
| 1,805,101 A | 5/1931 | Modine |

(Continued)

FOREIGN PATENT DOCUMENTS

| | | |
|---|---|---|
| CN | 101194140 | 6/2008 |
| DE | 3834822 | 4/1990 |

(Continued)

OTHER PUBLICATIONS

EP 11002113.6 Extended European Search Report dated May 11, 2011 (5 pages).

(Continued)

*Primary Examiner* — Stephen K Cronin
*Assistant Examiner* — Gonzalo Laguarda
(74) *Attorney, Agent, or Firm* — Michael Best & Friedrich LLP

(57) ABSTRACT

An exhaust gas recirculation cooler includes an inlet configured to receive exhaust gas from an engine, an outlet configured to direct the exhaust gas back toward the engine, and an exhaust gas flow conduit. The flow conduit includes a first end adjacent the inlet, a second end adjacent the outlet, a first narrow side, a second narrow side, substantially flat broad sides extending between the narrow sides, a first channel adjacent the first narrow side and extending between the ends, a second channel adjacent the second narrow side and extending between the ends, and a plurality of third channels located between the first and second channels and extending between the ends. A plate is located at one end of the flow conduit to inhibit the exhaust gas from flowing through at least one of the first channel and the second channel while allowing exhaust gas flow through the third channels.

20 Claims, 6 Drawing Sheets

(56) References Cited

U.S. PATENT DOCUMENTS

| | | | |
|---|---|---|---|
| 1,833,611 A * | 11/1931 | Kirgan | 165/103 |
| 1,847,743 A | 3/1932 | Anderson | |
| 1,974,402 A | 9/1934 | Templeton | |
| 2,013,186 A | 9/1935 | Price | |
| 2,044,457 A | 6/1936 | Young | |
| 2,184,657 A | 12/1939 | Young | |
| 2,209,974 A | 8/1940 | Jacobus | |
| 2,237,516 A | 4/1941 | Young | |
| 2,258,041 A | 10/1941 | Young | |
| 2,308,119 A | 1/1943 | Spieth | |
| 2,327,491 A | 8/1943 | Blasi | |
| 2,443,703 A | 6/1948 | Christensen | |
| 2,505,790 A | 5/1950 | Panthofer | |
| 2,984,456 A | 5/1961 | Young | |
| 4,125,280 A | 11/1978 | Kuzel | |
| 4,137,982 A | 2/1979 | Crews et al. | |
| 4,195,943 A | 4/1980 | Williams | |
| 4,202,407 A | 5/1980 | Woitowitz | |
| 4,254,819 A | 3/1981 | Worrell | |
| 4,295,521 A | 10/1981 | Sommars | |
| 4,369,837 A | 1/1983 | Moranne | |
| 4,501,321 A | 2/1985 | Real et al. | |
| 4,651,816 A | 3/1987 | Struss et al. | |
| 4,706,461 A | 11/1987 | Pratt et al. | |
| 4,805,693 A | 2/1989 | Flessate | |
| 4,997,033 A | 3/1991 | Ghiani et al. | |
| 5,052,475 A | 10/1991 | Grundy | |
| 5,127,466 A | 7/1992 | Ando | |
| 5,174,372 A | 12/1992 | Potier et al. | |
| 5,197,538 A | 3/1993 | Nagasaka et al. | |
| 5,226,235 A | 7/1993 | Lesage | |
| 5,234,051 A | 8/1993 | Weizenburger et al. | |
| 5,299,636 A | 4/1994 | Potier | |
| 5,301,748 A | 4/1994 | Potier | |
| 5,303,770 A | 4/1994 | Dierbeck | |
| 5,311,934 A | 5/1994 | Potier | |
| 5,325,915 A | 7/1994 | Fouts et al. | |
| 5,366,006 A | 11/1994 | Lu et al. | |
| 5,429,181 A | 7/1995 | Tordjeman | |
| 5,476,138 A | 12/1995 | Iwasaki et al. | |
| 5,490,560 A | 2/1996 | Helms et al. | |
| 5,505,257 A | 4/1996 | Goetz, Jr. | |
| 5,511,613 A | 4/1996 | Mohn et al. | |
| 5,535,821 A | 7/1996 | Potier | |
| 5,538,079 A | 7/1996 | Pawlick | |
| 5,566,748 A | 10/1996 | Christensen | |
| 5,671,803 A | 9/1997 | Tepas et al. | |
| RE35,710 E | 1/1998 | Shinmura | |
| 5,720,341 A | 2/1998 | Watanabe et al. | |
| 5,732,688 A * | 3/1998 | Charlton et al. | 123/568.12 |
| 5,894,649 A | 4/1999 | Lambert et al. | |
| 6,179,050 B1 * | 1/2001 | Dey et al. | 165/149 |
| 6,250,380 B1 * | 6/2001 | Strahle et al. | 165/167 |
| 6,293,334 B1 | 9/2001 | Ghiani | |
| 6,311,768 B1 | 11/2001 | Jamison et al. | |
| 6,318,450 B1 | 11/2001 | Acre | |
| 6,330,747 B1 | 12/2001 | Lambert et al. | |
| 6,357,520 B1 | 3/2002 | Kato et al. | |
| 6,412,547 B1 | 7/2002 | Siler | |
| 6,460,610 B2 | 10/2002 | Lambert et al. | |
| 6,527,046 B1 | 3/2003 | White | |
| 6,530,424 B2 * | 3/2003 | Jamison et al. | 165/153 |
| 6,601,640 B1 | 8/2003 | Staffa et al. | |
| 6,817,404 B2 | 11/2004 | Frana-Guthrie et al. | |
| 6,843,097 B2 | 1/2005 | Tatsuta et al. | |
| 6,874,570 B2 | 4/2005 | Horiuchi | |
| 6,907,916 B2 | 6/2005 | Koyama | |
| 6,928,730 B2 | 8/2005 | Beldam et al. | |
| 6,988,532 B2 | 1/2006 | Hamada | |
| 7,013,952 B2 * | 3/2006 | Park et al. | 165/78 |
| 7,036,561 B2 | 5/2006 | Yagi et al. | |
| 7,073,571 B2 | 7/2006 | Yu et al. | |
| 7,108,049 B2 | 9/2006 | Makino et al. | |
| 7,131,488 B2 | 11/2006 | Ozaki | |
| 7,143,824 B2 | 12/2006 | Emrich et al. | |
| 7,147,046 B2 | 12/2006 | Sanada et al. | |
| 7,198,095 B2 | 4/2007 | Nguyen | |
| 7,243,707 B2 * | 7/2007 | Brost et al. | 165/103 |
| 7,284,594 B2 | 10/2007 | Sanada et al. | |
| 7,303,002 B2 | 12/2007 | Usui et al. | |
| 7,380,544 B2 * | 6/2008 | Raduenz et al. | 123/568.12 |
| 7,392,837 B2 | 7/2008 | Makino et al. | |
| 7,478,630 B2 * | 1/2009 | Maucher et al. | 123/568.12 |
| 7,520,318 B2 | 4/2009 | Kwon | |
| 7,600,559 B2 * | 10/2009 | Strahle et al. | 165/167 |
| 7,631,688 B2 * | 12/2009 | Brost et al. | 165/166 |
| 7,637,309 B2 | 12/2009 | Contet | |
| 7,703,505 B2 * | 4/2010 | So et al. | 165/140 |
| 7,918,216 B2 * | 4/2011 | Gruner et al. | 123/568.12 |
| 7,946,339 B2 * | 5/2011 | So et al. | 165/140 |
| 7,992,628 B2 * | 8/2011 | Melby et al. | 165/166 |
| 8,033,323 B2 * | 10/2011 | Schatz et al. | 165/69 |
| 8,261,816 B2 * | 9/2012 | Ambros et al. | 165/183 |
| 8,424,592 B2 * | 4/2013 | Meshenky et al. | 165/151 |
| 8,516,699 B2 * | 8/2013 | Grippe et al. | 29/890.03 |
| 8,596,339 B2 * | 12/2013 | Palanchon | 165/103 |
| 2003/0010480 A1 * | 1/2003 | Shibagaki et al. | 165/158 |
| 2004/0069468 A1 | 4/2004 | Lamich et al. | |
| 2005/0161206 A1 | 7/2005 | Ambros et al. | |
| 2005/0263263 A1 | 12/2005 | Merklein et al. | |
| 2006/0118285 A1 | 6/2006 | Emrich et al. | |
| 2006/0201663 A1 * | 9/2006 | Strahle et al. | 165/164 |
| 2006/0231243 A1 * | 10/2006 | Sugihara et al. | 165/158 |
| 2007/0181294 A1 * | 8/2007 | Soldner et al. | 165/175 |
| 2008/0202724 A1 * | 8/2008 | Lorenz et al. | 165/51 |
| 2008/0202735 A1 * | 8/2008 | Geskes et al. | 165/166 |
| 2008/0230213 A1 | 9/2008 | Roll | |
| 2008/0264609 A1 | 10/2008 | Lutz et al. | |
| 2009/0194265 A1 * | 8/2009 | Nakamura | 165/149 |
| 2009/0235662 A1 | 9/2009 | Knafl et al. | |
| 2009/0250201 A1 * | 10/2009 | Grippe et al. | 165/164 |
| 2009/0260605 A1 | 10/2009 | Janssen et al. | |
| 2010/0025024 A1 * | 2/2010 | Meshenky et al. | 165/164 |

FOREIGN PATENT DOCUMENTS

| | | |
|---|---|---|
| DE | 4009726 | 10/1991 |
| DE | 19857435 | 6/1996 |
| DE | 19509654 | 9/1996 |
| DE | 19819247 | 11/1999 |
| DE | 19942458 | 3/2000 |
| DE | 10244629 | 4/2003 |
| DE | 102006031653 | 1/2008 |
| DE | 102007031824 | 3/2008 |
| DE | 102006058096 | 6/2008 |
| EP | 0515924 | 12/1992 |
| EP | 0656517 | 6/1995 |
| EP | 0704666 | 4/1996 |
| EP | 1764570 | 3/2007 |
| EP | 1923653 | 5/2008 |
| EP | 1923654 | 5/2008 |
| GB | 2048451 | 12/1980 |
| JP | 2004325007 | 11/2004 |
| JP | 2005083647 | 3/2005 |
| WO | 2005050120 | 6/2005 |
| WO | 2007105992 | 9/2007 |
| WO | 2010003807 | 1/2010 |

OTHER PUBLICATIONS

Notification of First Office Action from the State Intellectual Property Office of the People's Republic of China for Chinese Application No. 201110068054.8 dated Feb. 28, 2014 (23 pages) with English translation.

* cited by examiner

HEAT EXCHANGER AND METHOD OF MANUFACTURING THE SAME

CROSS-REFERENCE TO RELATED APPLICATIONS

This application claims priority to U.S. Provisional Patent Application No. 61/315,055, filed Mar. 18, 2010, the entire contents of which are hereby incorporated by reference.

BACKGROUND

Heat exchangers used to cool gases of all types are known in the art. By way of example only, and for purposes of illustration herein, many heat exchangers are adapted to cool exhaust gases (e.g., produced by internal combustion engines, gas turbines, or other exhaust producing processes or devices). In certain applications commonly referred to as exhaust gas recirculation (EGR), some portion of the exhaust gas produced by an engine is cooled and recirculated back to the intake manifold of the engine. The relatively inert exhaust gas is added to the fresh combustion air charge delivered to the intake manifold, and can serve to lower the combustion temperature within the engine, thereby reducing the rate of formation of $NO_x$, an environmental pollutant. In order to achieve the foregoing in this exemplary application, it is typically necessary for the temperature of the recirculated exhaust to be substantially reduced prior to its re-entry into the engine, and one or more heat exchangers (EGR coolers or EGRC) are typically used to cool the recirculated exhaust.

Fouling of heat exchange surfaces is a known problem when heat exchangers are exposed to many types of gases. Fouling refers to the accumulation of matter on the heat exchange surfaces, which has a detrimental impact on heat exchanger performance. With reference again to the case of exhaust gas heat exchangers, for example, particulates that are entrained within the exhaust flow are deposited onto surfaces that are exposed to the exhaust. The accumulation of particulate on the surfaces adds an additional resistance to the transfer of heat energy from the exhaust gas to the cooling fluid of the heat exchanger, and increases the pressure drop through the heat exchanger by constricting the available flow area.

The impact of fouling is typically taken into account when sizing a heat exchanger for cooling by applying a fouling factor in the heat transfer calculation. The fouling factor decreases the effective overall heat transfer coefficient of the heat exchanger, in order to ensure that the heat exchanger will be appropriately sized for the required heat transfer capability when operating in a fouled state.

The fouling factor will vary with the specifics of each heat exchanger geometry, and will also vary with the conditions under which the heat exchanger is operated. Specifically, it is known that the fouling factor has an inverse relationship with the Reynolds number (Re) of the flow. As is known in the art, the Reynolds number relates the flow's inertial forces to the flow's viscous forces. The Reynolds number can be calculated by the equation:

$$Re = \frac{m \cdot D}{A \cdot \mu},$$

where m is the mass flow rate of the fluid, A is the cross-sectional area of the flow path, D is the hydraulic diameter of the flow path, and $\mu$ is the dynamic viscosity of the fluid.

In the design and sizing of heat exchangers in general, a common approach to improving the heat exchanger performance is to increase the surface area density, or the amount of extended surface per unit volume that is exposed to the heat exchange fluid. This approach will result in a decrease in the Reynolds number, since the hydraulic diameter of the channels will be reduced. In a heat exchanger exposed to exhaust gas, this decrease in Reynolds number will tend to increase the fouling factor, thereby reducing or even entirely eliminating the desired improvement in heat exchanger performance.

In light of the continuing need for heat exchangers operable in a fouled state, having a high surface area density, and/or having a reduced susceptibility to performance degradation due to fouling, improved heat exchangers continue to be welcome additions to the art.

SUMMARY OF THE INVENTION

In some embodiments of the invention, an EGR cooler includes an exhaust gas flow conduit having first and second opposing arcuately shaped narrow sides with broad and substantially flat sides extending therebetween. The exhaust gas flow conduit comprises a first flow channel adjacent the first arcuately shaped narrow side, having a first flow area and a first hydraulic diameter. The exhaust gas flow conduit further comprises a second flow channel adjacent the second arcuately shaped narrow side, having a second flow area and a second hydraulic diameter similar to the first flow area and the first hydraulic diameter, respectively. The exhaust gas flow conduit further comprises a plurality of third flow channels located between the first and second flow channels, each of the third flow channels having a third flow area and a third hydraulic diameter. The third flow area is substantially smaller than the first and second flow areas, and the third hydraulic diameter is substantially smaller than the first and second hydraulic diameters. A fluid flowing through the exhaust gas flow conduit is substantially blocked from accessing the first and second flow channels by a plate located at one of an inlet and an outlet of the exhaust gas flow conduit.

In some embodiments, the exhaust gas flow conduit is one of a plurality of similar exhaust gas flow conduits, and the plate substantially blocks access to the first and second flow channels of the plurality of exhaust gas flow conduits.

In some embodiments, the EGR cooler further includes a header to receive one of an inlet and an outlet end of the exhaust gas flow conduit. In some such embodiments, the flow blocking plate is attached to the header at least one attachment point.

In some embodiments, the plurality of third flow channels is at least partially defined by a convoluted fin structure. In some such embodiments, the convoluted fin structure includes fin crests connected to the broad flat sides of the exhaust gas flow conduit.

In one embodiment, the invention provides an exhaust gas recirculation cooler configured to cool exhaust gas from an engine, the exhaust gas recirculation cooler comprising an inlet configured to receive the exhaust gas from the engine; an outlet configured to direct the exhaust gas back toward the engine; an exhaust gas flow conduit including a first end adjacent the inlet, a second end adjacent the outlet, a first narrow side, a second narrow side opposite the first narrow side, substantially flat broad sides extending between the first narrow side and the second narrow side, a first channel adjacent the first narrow side and extending between the first end and the second end, a second channel adjacent the second narrow side and extending between the first end and the second end, and a plurality of third channels located between the first channel and the second channel and extending between the first end and the second end; and a plate located at one of the first end and the second end of the exhaust gas flow conduit to inhibit the exhaust gas from flowing through at least one of the first channel and the second channel while allowing exhaust gas flow through the plurality of third channels.

In another embodiment, the invention provides an exhaust gas recirculation cooler configured to cool exhaust gas from an engine, the exhaust gas recirculation cooler comprising an inlet configured to receive the exhaust gas from the engine; an outlet configured to direct the exhaust gas back toward the engine; an exhaust gas flow conduit including a first end adjacent the inlet, a second end adjacent the outlet, a first arcuately shaped side, a second arcuately shaped side opposite the first arcuately shaped side, substantially flat broad sides extending between the first arcuately shaped side and the second arcuately shaped side, a first channel adjacent the first arcuately shaped side and extending between the first end and the second end, the first channel having a first hydraulic diameter, a second channel adjacent the second arcuately shaped side and extending between the first end and the second end, the second channel having a second hydraulic diameter, and a plurality of third channels located between the first channel and the second channel, each of the third channels having a third hydraulic diameter, the third hydraulic diameter less than the first hydraulic diameter; and a plate located at one of the first end and the second end of the exhaust gas flow conduit to inhibit the exhaust gas from flowing through at least one of the first channel and the second channel while allowing exhaust gas flow through the plurality of third channels.

Although the heat exchanger types and applications described herein are EGR heat exchangers, it will be appreciated that the various features, structures, and methods described herein are applicable to heat exchangers used for cooling any other type of gas in any application.

Other objects, features, and advantages of the invention will become apparent from a review of the entire specification, including the appended drawings.

DETAILED DESCRIPTION

Figure 1:
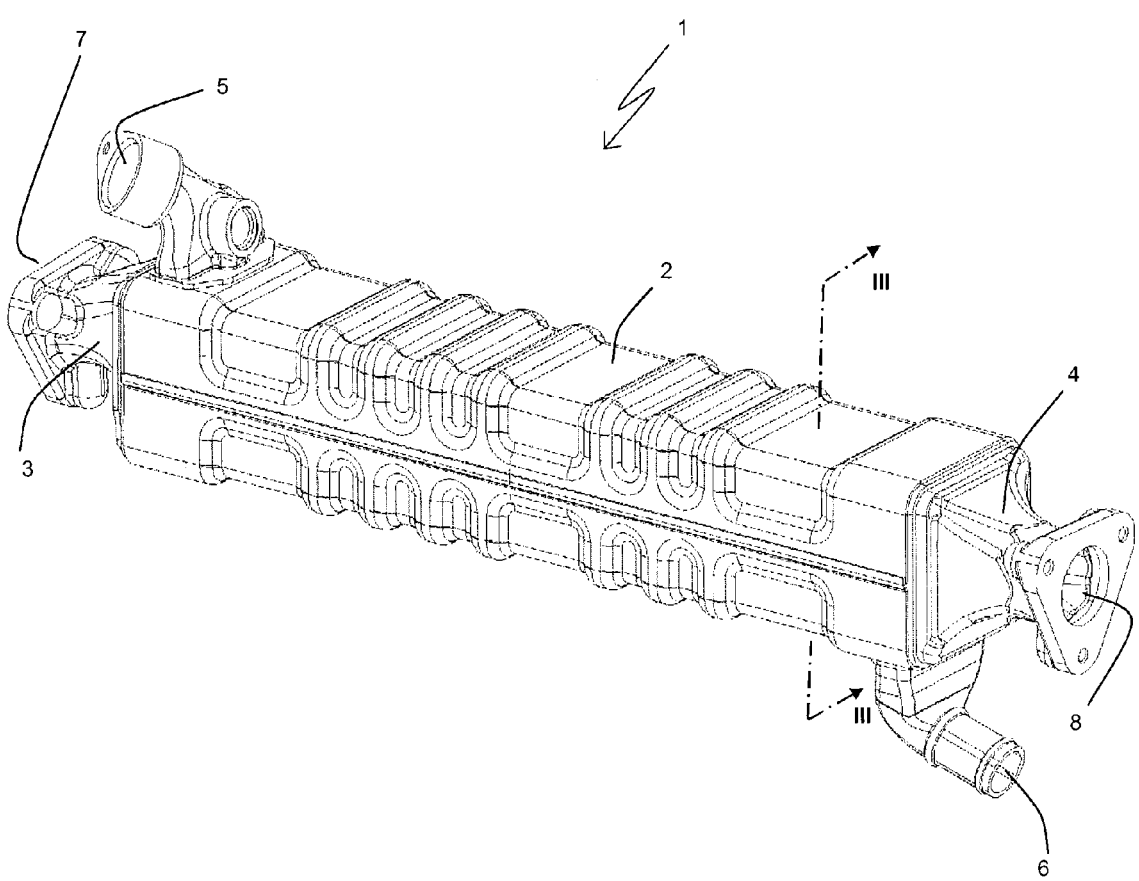
FIG. 1 is a perspective view of an EGR cooler according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

An embodiment of a heat exchanger 1 according to the present invention is shown in FIGS. 1-4 and includes an outer casing 2, an exhaust gas inlet tank 3 and an exhaust gas outlet tank 4 at opposing ends of the casing 2, and coolant ports 5 and 6. The embodiment shown may be especially useful as an EGR cooler to cool a flow of recirculated exhaust gas entering the heat exchanger 1 through an exhaust flow inlet port 7 from the exhaust manifold of an internal combustion engine (not shown), and to deliver the cooled flow from the exhaust flow exit or outlet port 8 to an intake manifold of the engine. It should be recognized, however, that the heat exchanger 1 may find utility as an exhaust gas cooler or as a heat exchanger for cooling or heating any other gases in any other application as well.

Figure 2:
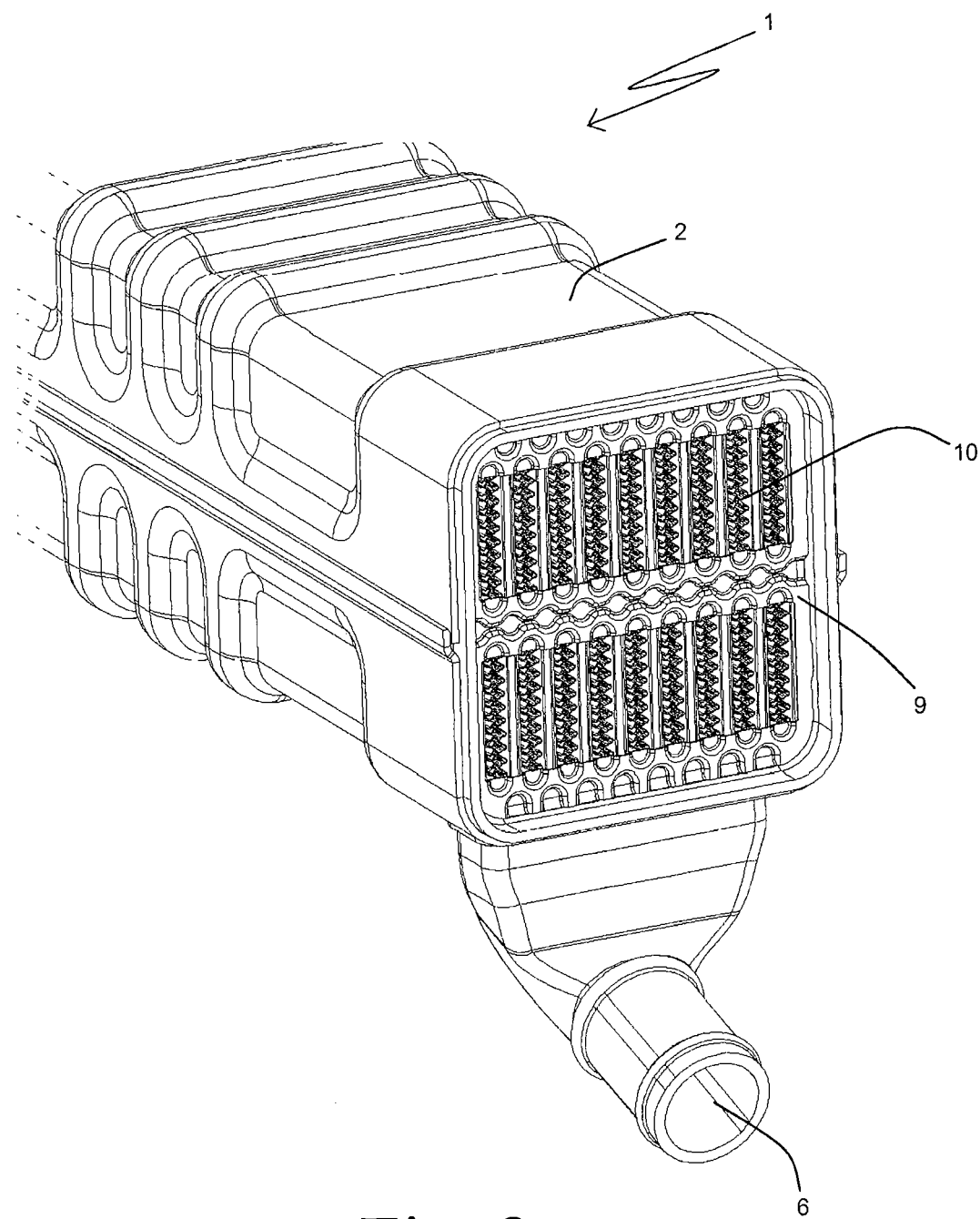
FIG. 2 is a perspective view of a portion of the EGR cooler of FIG. 1, with some parts removed.
Figure 3:
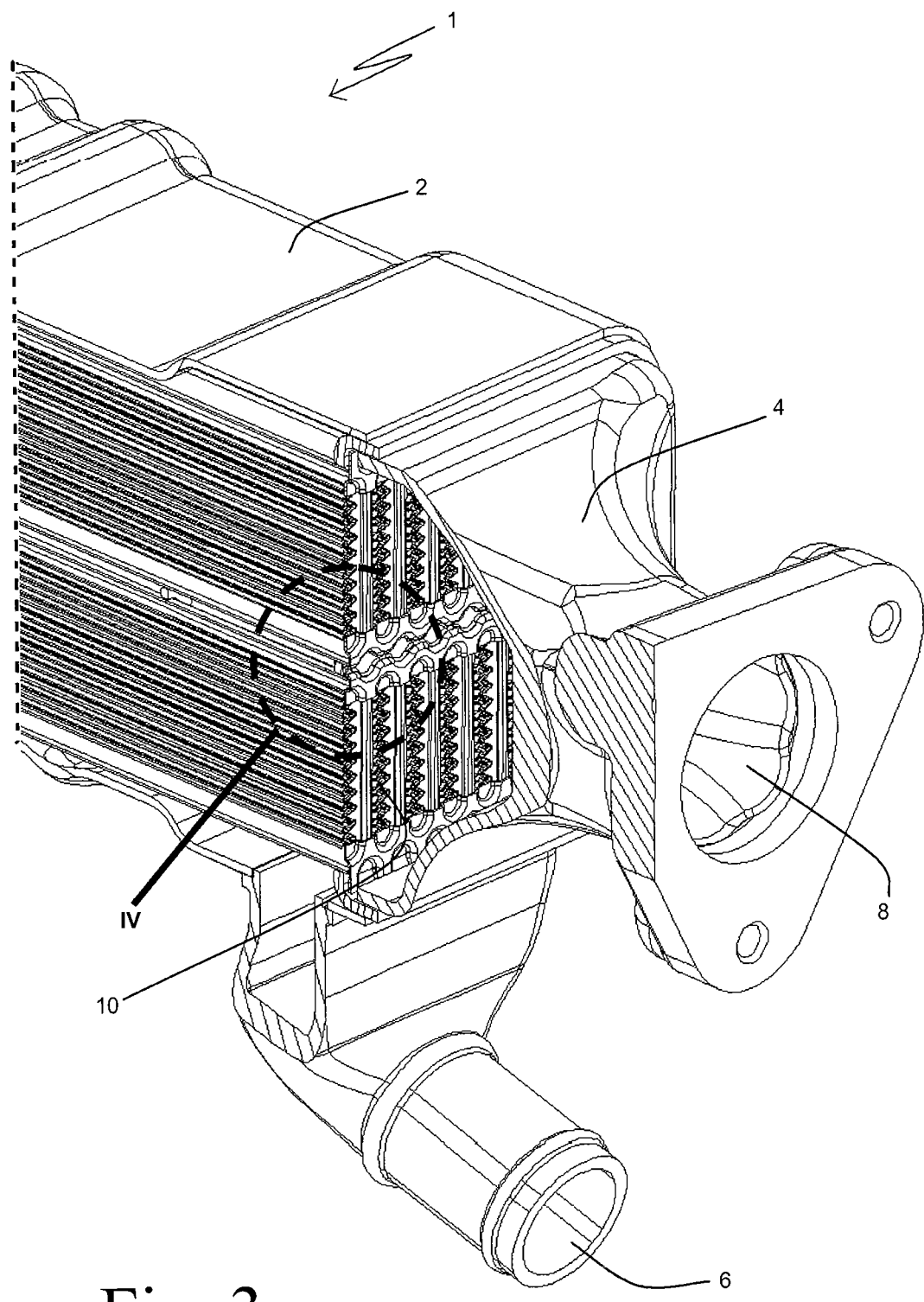
FIG. 3 is a partial sectional view taken along line III-III of FIG. 1.
Figure 4:
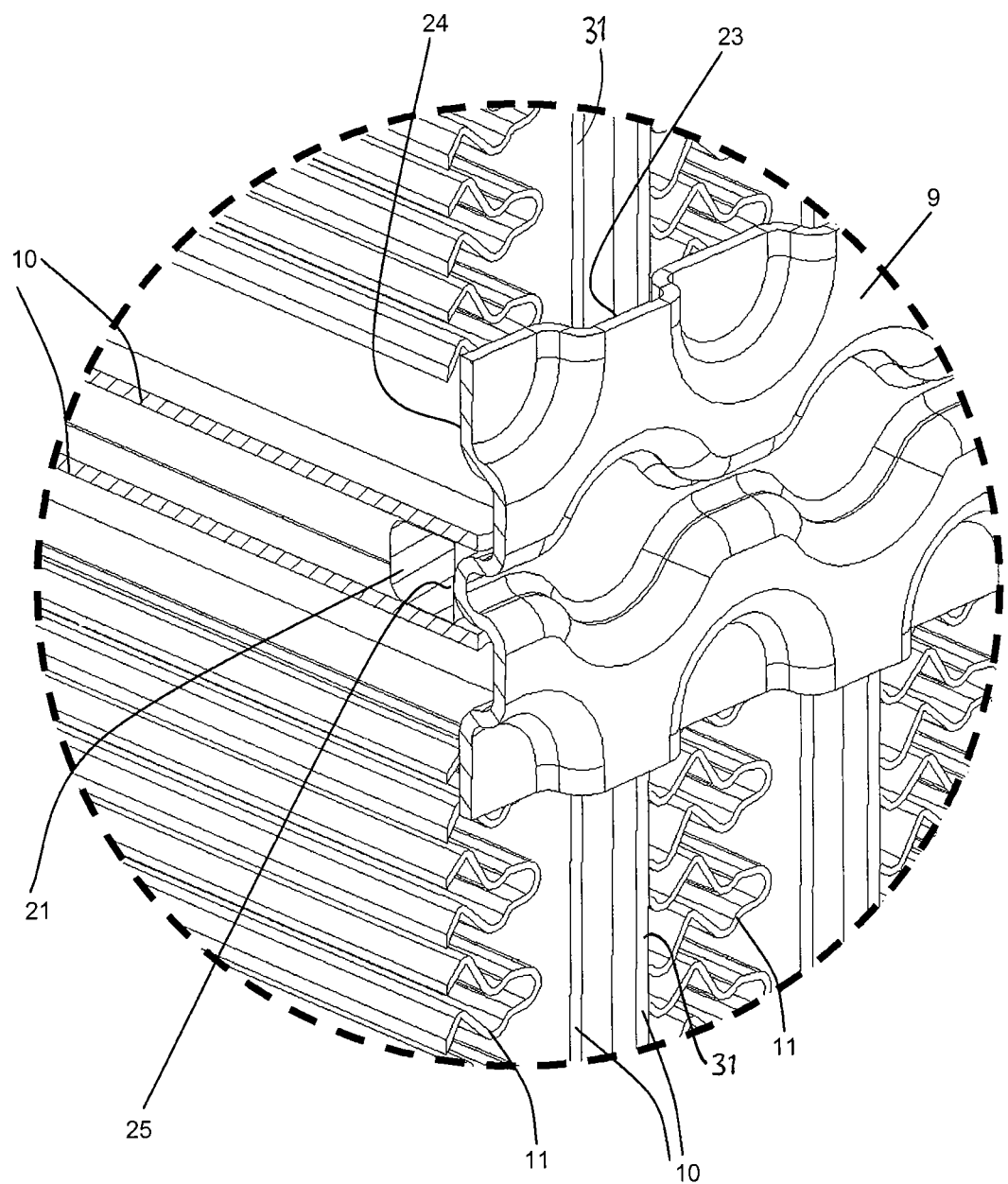
FIG. 4 is a detail view of section IV of FIG. 3.

Referring to FIGS. 1 and 2, the heat exchanger 1 of the illustrated embodiment further includes a plurality of exhaust gas flow conduits 10 extending between the inlet tank 3 and the outlet tank 4. The exhaust gas flow conduits 10 are arranged in spaced relation to allow a flow of coolant to pass over the outer surfaces of the conduits 10 in order to facilitate the removal of heat from an exhaust gas flow passing through the conduits 10. The coolant may be directed through the heat exchanger 1 from the coolant port 6 to the coolant port 5, so as to place the coolant in a counter-current flow orientation with respect to the exhaust gas flow, or from the coolant port 5 to the coolant port 6, so as to place the coolant flow in a con-current flow orientation with respect to the exhaust gas flow. Still other flow relationships between the coolant flow and exhaust gas flow are possible, and fall within the spirit and scope of the present invention.

The coolant that is directed over the exhaust gas flow conduits 10 to remove heat from the exhaust gas may be any liquid or gaseous flow that is at a lower temperature than the flow of exhaust gas. For example, the coolant may be a typical engine coolant such as ethylene glycol, propylene glycol, water, or some mixture thereof. In some embodiments, the coolant may be a refrigerant or a working fluid for a Rankine cycle. In other embodiments the coolant may be air.

Although the illustrated embodiment depicts eighteen exhaust gas flow conduits 10 arranged in two rows of nine conduits each, it should be understood that both the number of rows and the number of conduits within each row may be greater or less than the number shown, depending on the specific intended application.

Figure 5:
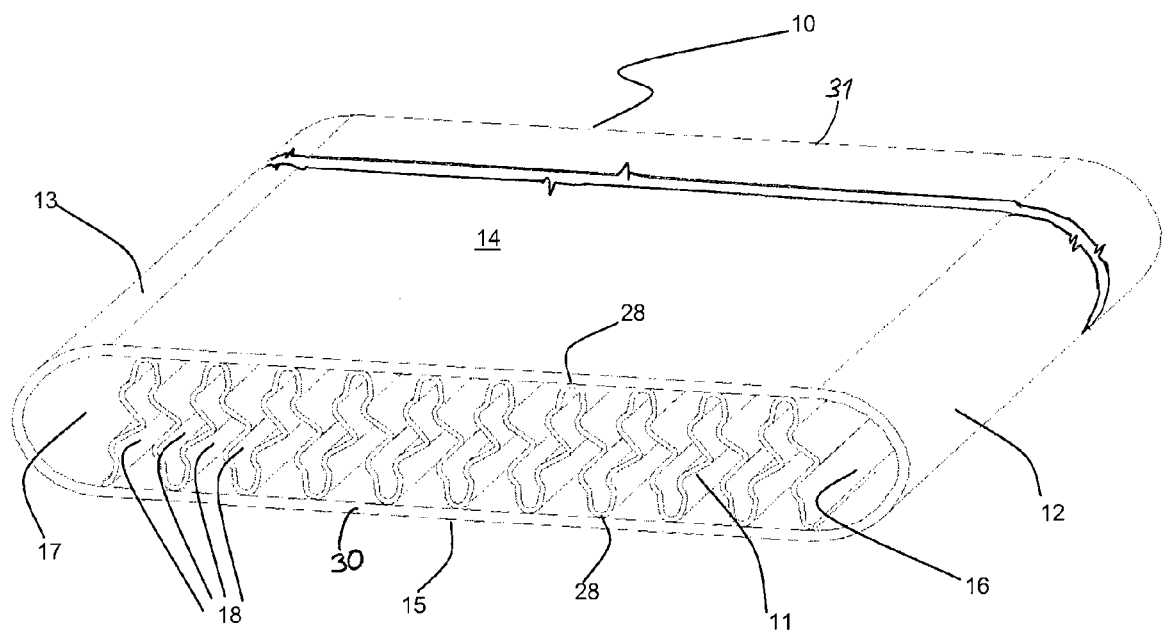
FIG. 5 is a perspective view of an exhaust gas flow conduit from the embodiment of FIG. 1.

FIG. 5 depicts one of the exhaust gas flow conduits 10 in greater detail. The exhaust gas flow conduit 10 includes a first end 30 adjacent the inlet port 7 and a second end 31 adjacent the outlet port 8. The exhaust gas flow conduit 10 in the illustrated embodiment also has a first arcuately shaped narrow side 12, a second arcuately shaped narrow side 13 opposite the first narrow side 12, and substantially flat broad sides 14, 15 extending between the narrow sides 12, 13 to form an enclosed flow conduit. The arcuate shape of the narrow sides 12, 13 can provide enhanced durability to the heat exchanger 1 by eliminating the geometric stress risers that may occur at the corners of a rectangular shaped flow conduit. In other embodiments, however, flow conduits 10 having other shapes (e.g., an arcuately shaped first narrow side and a generally rectangularly-shaped second narrow side, generally rectangular first and second narrow sides, first and/or second narrow sides having triangular or other faceted shapes, and the like) may alternatively be employed.

The exhaust gas flow conduit 10 comprises a first channel 16 adjacent the first arcuately shaped narrow side 12, and a second channel 17 adjacent the second arcuately shaped narrow side 13. The first and second channels 16, 17 extend between the first end 30 and the second end 31 of the exhaust gas flow conduit 10 to direct exhaust gas from the inlet port 7 to the outlet port 8. The exhaust gas flow conduit 10 further comprises a plurality of third channels 18 located between the channels 16, 17. The third channels 18 extend between the first end 30 and the second end 31 of the exhaust gas flow conduit 10 to direct exhaust gas from the inlet port 7 to the outlet port 8. The plurality of third channels 18 may be at least partially defined by a convoluted fin structure 11 located within the exhaust gas flow conduit 10. In some embodiments, part or all of the fin structure 11 is defined by a separate element (e.g., an "insert") received within the gas flow conduit 10. In some embodiments, it may be advantageous for the convoluted fin structure 11 to include multiple crests 28 that are bonded to either or both of the broad flat sides 14, 15 by, for example, by brazing.

Figure 6:
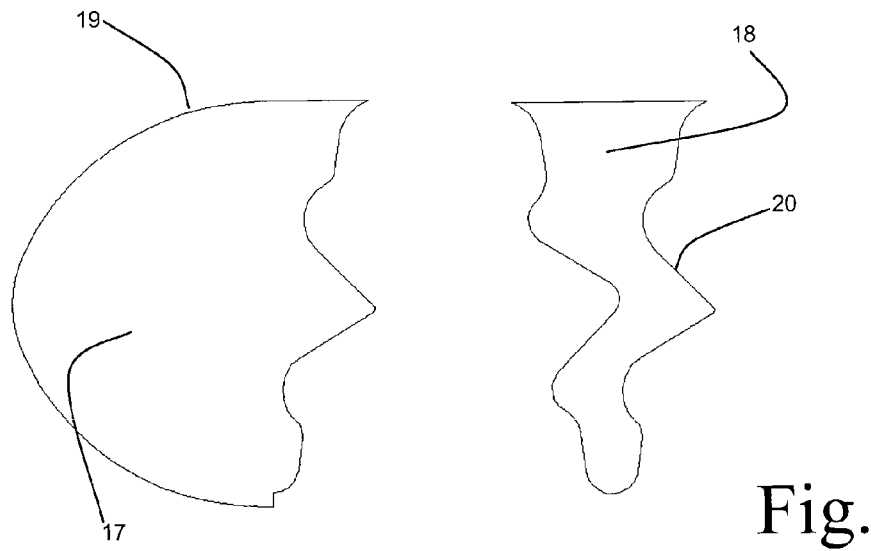
FIG. 6 is a comparison of flow areas within the exhaust gas flow conduit of FIG. 5.

FIG. 6 depicts the channels 17, 18 side-by-side at a common scale for comparison. It should be readily apparent from inspection of FIG. 6 that the cross-sectional area of the channel 18 is substantially less than the cross-sectional area of the channel 17. In the illustrated embodiment, the ratio of the cross-sectional area of channel 18 to the cross-sectional area of channel 17 is about 0.36. In other embodiments, the ratio of the cross-sectional area of channel 18 to the cross-sectional area of channel 17 can be in a range from about 0.30 to about 0.50. Other differences between the cross-sectional area of the channel 16 and/or 17 and the intermediate channels 18 are possible in other embodiments, including those with convoluted fin structures 11 of different sizes and shapes, flow conduits 10 having different narrow side shapes, and the like.

In performing calculations of the heat transfer behavior and/or pressure drop of a fluid flowing through a channel, it is useful to consider the hydraulic diameter of the channel as a characteristic length. The hydraulic diameter is conventionally defined as being equal to four times the ratio of the channel's flow area to its wetted perimeter. For the channels 17, 18 of FIG. 6, the wetted perimeters are indicated as 19 and 20, respectively. In the illustrated embodiment, the ratio of the hydraulic diameter of the third channel 18 to the hydraulic diameter of the second channel 17 is about 0.40. In other words, the hydraulic diameter of the second channel 17 is approximately two and a half times greater than the hydraulic diameter of each of the plurality of third channels 18 in the illustrated embodiment. In the other embodiments, the ratio of the hydraulic diameter of the third channel 18 to the hydraulic diameter of the second channel 17 can be in a range from about 0.30 to about 0.50. In yet other embodiments, the ratio of the hydraulic diameter of the third channel 18 to the hydraulic diameter of the second channel 17 can be less than about 0.75. It should be understood that the first channel 16 of the illustrated embodiment, while not shown in FIG. 6, is similar in both flow area and hydraulic diameter to the second channel 17, and has approximately the same ratios of flow area and hydraulic diameter to the channels 18.

It should be readily appreciated by those having skill in the art of heat exchangers that the hydraulic diameter of the plurality of third channels 18 will be reduced as the center-to-center spacing of the crests 28 of the convoluted fin structure 11 is decreased. Such a decrease may be seen as advantageous to the thermal performance of the heat exchanger 1, since it will increase the amount of convective surface area exposed to the fluid passing through the flow conduit 10, albeit at the expense of an increase in the pressure drop imposed on the fluid. The hydraulic diameter of the first and second channels 16, 17 are not, however, affected by such a change in the center-to-center spacing, since the arcuate profile of the narrow sides 12, 13 preclude the extension of the convoluted insert 11 into the channels 16, 17.

Figure 8:
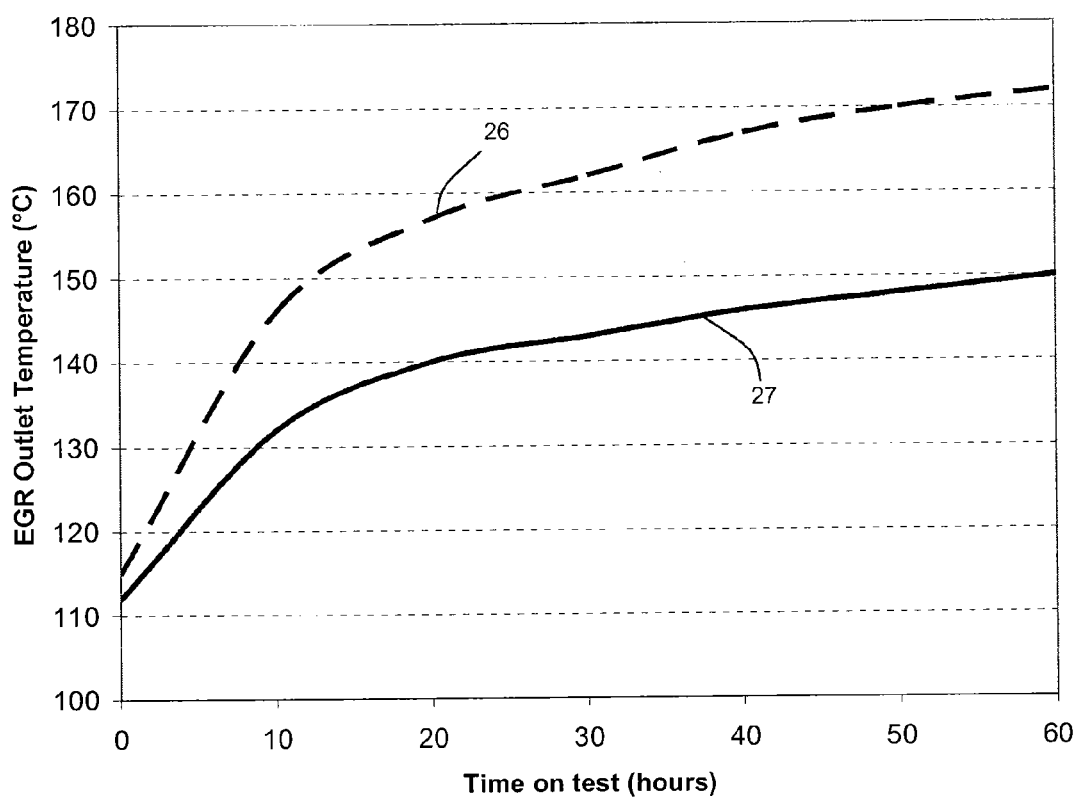
FIG. 8 is a graph depicting performance test results of an EGR cooler according to an embodiment of the invention.

The inventors have found that when the aforementioned ratio of the hydraulic diameter of channels 18 to that of channels 16, 17 is decreased to be substantially smaller than a value of 1.0, then the heat exchanger 1 can be predisposed to have a high susceptibility to performance degradation due to fouling. This can be seen by the dashed line 26 in FIG. 8, which depicts test data of an EGR cooler having exhaust flow conduits 10 as depicted in FIGS. 5 and 6. The EGR cooler was tested at normal operating conditions by passing exhaust flow from an internal combustion engine through the exhaust gas flow conduits, with a flow of coolant removing heat from the exhaust flow as it passes through the exhaust flow conduits 10. The exhaust gas flow enters the exhaust gas flow conduits 10 at a temperature of approximately 600° C., as is typical for EGR coolers in vehicular applications. The graph in FIG. 8 shows the temperature of the cooled exhaust flow exiting the exhaust gas flow conduits over the duration of the test. As evidenced by the graph, the heat transfer performance of the EGR cooler decreases with increased time on test, due to fouling of the heat exchange surfaces exposed to the exhaust gas. The resulting increase in the temperature of the exhaust gas exiting the exhaust gas flow conduits 10 is not desirable for EGR coolers.

Test data such as that shown by the dashed line 26 can be used to determine an appropriate fouling factor for use in the sizing of a heat exchanger, such as for example an EGR cooler, for specific applications. Such a fouling factor may be used to ensure that the heat exchanger is sized to deliver acceptable performance even when operated in a foreseeable fouled condition.

Although not wishing to subscribe to a particular theory regarding fouling and the impact of fouling upon a heat exchanger, it is believed that at least some amount of the observed performance degradation due to fouling may be the result of a non-preferential redistribution of exhaust gas flow occurring as the surfaces become fouled. Specifically, as a layer of particulate material forms on the surfaces of the convoluted fin structure 11, the percentage reduction in flow area of the plurality of third channels 18 will be substantially greater than the percentage reduction in flow area of the first and second channels 16 and 17, due to the smaller ratio of flow area to wetted (e.g., fouled) perimeter of the channels 18, as evidenced by their smaller hydraulic diameter. The reduction in flow area results in a corresponding reduction in hydraulic diameter, both of which contribute to an increased resistance to flow through the channels (i.e. increased pressure drop). Since the channels 16, 17, 18 are hydraulically in parallel, the pressure drop across all channels is identical, and the distribution of exhaust gas flow between the channels will adjust as needed.

Accordingly, the percentage of total exhaust gas flow that passes through the first and second channels 16, 17 will increase as the surfaces foul and the ratio of the hydraulic diameter of the third channels 18 to the hydraulic diameter of the first and second channels 16, 17 decreases. It is believed that the redistribution of flow to balance the pressure drops through the channels results in a reduction of the flow velocity through the third channels 18 and an increase in the flow velocity through the first and second channels 16, 17. It is well known that the rate of fouling is inversely proportional to flow velocity. While not wishing to be bound by theory, the inventors believe that a positive feedback mechanism is created, whereby fouling leads to redistribution of flow away from the third channels 18, which leads to increased fouling of those channels 18, leading to additional redistribution of flow, and so on, until a stable, fouled operating condition is achieved wherein a substantial portion of the total exhaust gas flow is directed through the first and second channels 16, 17.

Figure 7:
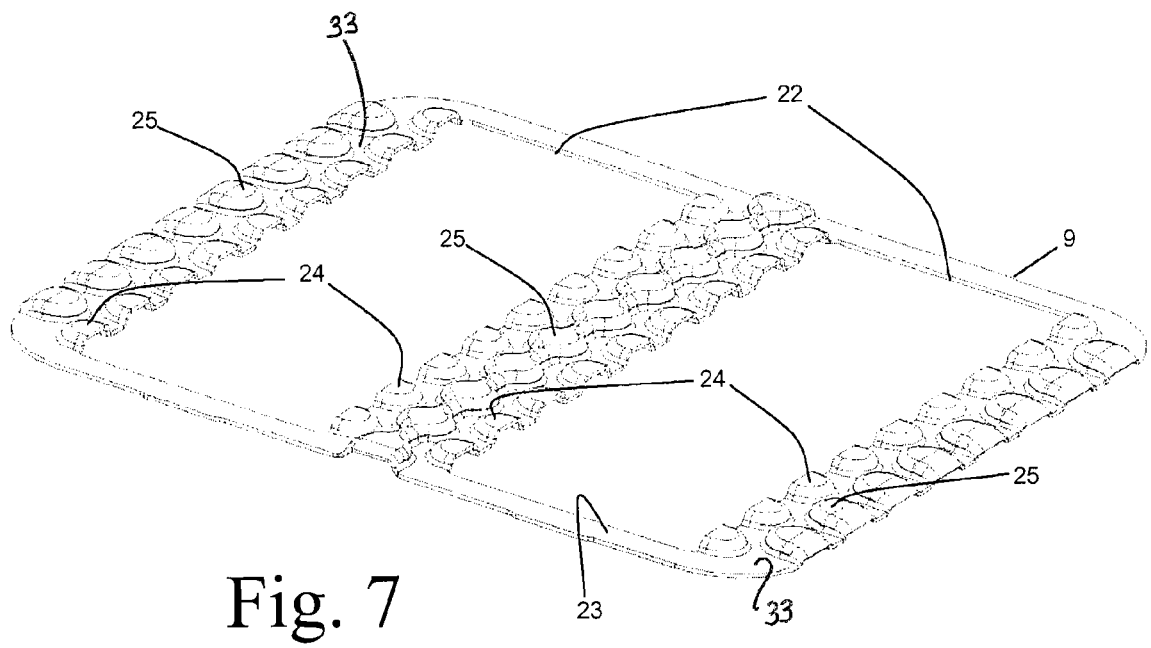
FIG. 7 is a perspective view of a flow blocking plate from the embodiment of FIG. 1.

In order to improve the thermal performance of the heat exchanger 1 when operating in a fouled condition, the heat exchanger of FIGS. 1-4 includes a flow blocking plate 9 positioned at the outlet end 31 of the exhaust gas flow conduits 10. The flow blocking plate 9 includes apertures 22 (FIG. 7) aligned with at least some of the third plurality of channels 18 of at least some of the exhaust gas flow conduits 10. The flow blocking plate 9 of the illustrated embodiment has apertures 22 that are common to channels 18 of multiple exhaust gas flow conduits 10. However, in some embodiments, each exhaust gas flow conduit 10 may have its own aperture 22.

With continued reference to the illustrated embodiment, the flow blocking plate 9 includes a face 23 that may be advantageously positioned adjacent one of the ends 30, 31 (e.g., the outlet end 31) of the exhaust gas flow conduits 10. The ends 31 penetrate through and are received by a header 21 (FIG. 4) of the heat exchanger 1. As can be best seen in FIG. 4, these ends 31 can extend for a certain portion beyond the surface of the header 21, due to, for example, manufacturing and assembly tolerances.

Also included in the illustrated flow blocking plate 9 is a plurality of surfaces 25 that are offset from the face 23. In some embodiments, each of the surfaces 25 is defined by a raised surface of the flow blocking plate 9 (when viewed in the orientation of FIG. 7, for example). The raised surfaces 25 can have any shape desired. In the illustrated embodiment, the raised surfaces 25 are shaped as plateaus that are substantially planar and flat. In other embodiments, the raised surfaces 25 may be shaped as pointed peaks, as rounded peaks, or as a combination of different shapes. The surfaces 25 can directly couple or mate against the face of the header 21, and the flow blocking plate 9 can be at least partially joined to the header 21 at one or more of the surfaces 25, such as by welding, brazing, or other joining processes.

The flow blocking plate 9 further includes a plurality of surfaces 24 offset from the face 23 and positioned so as to be received within the exhaust gas flow conduits 10 near (i.e., adjacent) the arcuate narrow sides 12, 13. In some embodiments, the surfaces 24 are also adjacent an end of the convoluted fin structure 11. This provides a tortuous flow path for exhaust gas flowing through the first and second channels 16, 17 of each of the exhaust gas flow conduits 10. Thereby, exhaust gas flow is directed through those channels (e.g., the third channels 18) that are in alignment with the apertures 22. In some embodiments, all or substantially all of the exhaust gas flow is directed in this manner. As with the raised surfaces 25 described above, each of the surfaces 24 is defined by a raised surface of the flow blocking plate 9 (when viewed in the orientation of FIG. 7, for example). In the illustrated embodiment, the raised surfaces 24 are shaped as plateaus. In other embodiments, the raised surfaces 24 may be shaped as pointed peaks, as rounded peaks, or as a combination of different shapes.

The flow blocking plate 9 of the illustrated embodiment is a single flow blocking plate 9 adapted to block multiple channels 16, 17 of the flow conduits 10. In some embodiments, two or more flow blocking plates 9 can be located at the ends 30, 31 of a bundle of flow conduits for achieving this same purpose. By way of example only, the flow blocking plate 9 shown in FIG. 7 can be replaced with two side-by-side flow blocking plates 9 that together define the same shape as that shown in FIG. 7. The flow blocking plate 9 of FIG. 7 can be constructed of any number of flow blocking plates, each of which are shaped and positioned to block (e.g., cover) two or more channels 16, 17. In some embodiments, a flow blocking plate 9 is shaped and positioned to block two or more channels 16, 17 and/or to extend between exhaust gas flow conduits 10 in two or more locations. Also, such a flow blocking plate 9 can block only channels 16, 17 located at a common narrow side 12, 13 of two or more adjacent exhaust gas flow conduits 10, and/or can block channels 16, 17 at both narrow sides 12, 13 of the same exhaust gas flow conduit 10. Depending upon the shape and size of the flow blocking plate 9, any number and combination of channels 16, 17 in a bundle of exhaust gas flow conduits 10 can be blocked by a flow blocking plate 9. Similarly, depending upon the shape and size of the flow blocking plate 9, such flow blocking plates 9 can extend to any number and combination of locations between exhaust gas flow conduits 10.

Although the flow blocking plate 9 of the illustrated embodiment covers and blocks channels 16, 17 at both narrow sides 12, 13 of each exhaust gas flow conduit 10 of the heat exchanger 1, it should be noted the flow blocking plate 9 can cover and block any subset of the channels 16, 17, based at least in part upon the shape of the flow blocking plate 9 selected.

With continued reference to the flow blocking plate 9 of the illustrated embodiment, the surfaces 24, 25 of the flow blocking plate 9 are connected to one another by webs 33 of material integral to the surfaces 24, 25. These webs of material 33 connect all of the surfaces 24, 25 together in the illustrated embodiment. In other embodiments, any other number, shape, and location of webs 33 can be used to connect any number of surfaces 24 and/or 25 together to at least partially define the flow blocking plate 9. Such webs 33 can, for example, extend between and connect adjacent surfaces 24 of the flow blocking plate 9 covering the channels 16, 17 at the narrow sides 12, 13 of the exhaust gas flow conduits 10. The webs 33 can also extend between and connect adjacent surfaces 25 of the flow blocking plate 9 located between adjacent exhaust gas flow conduits 10, and/or can extend between and connect each of these types of surfaces 24, 25.

As described above, each of the surfaces 24, 25 of the illustrated flow blocking plate embodiment has a respective raised portion. In this regard, the surfaces 24, 25 can each be defined by a projection having any shape suitable for insertion within ends of the channels 16, 17 or in locations between the exhaust gas flow conduits 10. In other embodiments, any number of the surfaces 24 and/or 25 can be substantially flat, and need not necessarily extend into such locations to perform the functions described herein. For example, some or all of the surfaces 24 of the flow blocking plate 9 can be substantially flat, and can be positioned to cover the narrow sides 12, 13 of the channels 16, 17. In still other embodiments, any number of the surfaces 24 can instead be defined by a recess in the flow blocking plate 9 within which one of the narrow sides 12, 13 of an exhaust gas flow conduit 10 is received to cover and block the corresponding channel 16, 17 of the exhaust gas flow conduit 10.

In those embodiments in which surfaces 24 of the flow blocking plate 9 extend into the channels 16, 17, or in which the surfaces 24 of the flow blocking plate 9 receive the narrow sides 12, 13 adjacent the channels 16, 17, the surfaces 24 can each have a shape corresponding to the interior or exterior shape of the narrow sides 12, 13, respectively. Matching the shape of the surfaces 24 in this manner can improve the ability of the flow blocking plate 9 to perform its function.

The flow blocking plate 9 can be manufactured in a number of different manners, such as by stamping, molding, machining, and the like. In some embodiments, the flow blocking plate 9 can be produced from a single sheet of material having a constant or substantially constant thickness, and that is formed in any suitable manner to the final shape desired for installation on the exhaust gas flow conduits 10. Accordingly, the surfaces 24, 25 described herein can be created by being forced out of plane with respect to surrounding surfaces (e.g., webs 33) of the sheet of material.

Although the illustrated embodiment includes the flow blocking plate at the exhaust gas outlet end 31 of the flow conduits 10, the same or similar effect can be achieved by placing a flow blocking plate 9 at the inlet end 30 of the flow conduits 10 in place of or in addition to the flow blocking plate 9 at the outlet end 31.

Impeding the ability of exhaust gas to bypass the third channels 18 in favor of the first and second channels 16, 17 with the flow blocking plate 9 helps maintain the thermal performance of the heat exchanger 1. In particular, if the heat exchanger 1 did not include the flow blocking plate 9, the thermal performance may be reduced due to the feedback mechanism described above. In order to evaluate the benefit derived from the flow blocking plate 9, a heat exchanger identical to the one used to generate the test data of dashed line 26, excepting the addition of a flow blocking plate 9, was tested in an identical manner. The results of that test are indicated by the solid line 27 in FIG. 8. As evidenced by the graph, the heat exchanger 1 with the flow blocking plate 9 showed an improved performance in the clean condition (i.e. at 0 hours time on test). As the heat exchangers fouled over the course of the test, however, the heat exchanger 1 with the flow blocking plate 9 showed a pronounced improvement in thermal performance over the heat exchanger without a flow blocking plate. Surprisingly, heat exchangers operating in the fouled condition produced an almost identical pressure drop, suggesting that the third channels 18 in the heat exchanger 1 with the flow blocking plate 9 experienced less flow channel constriction due to fouling than did the flow channels in the heat exchanger without a flow blocking plate.

The addition of a flow blocking plate 9 may especially provide a desirable improvement in the heat transfer performance of an exhaust gas heat exchanger when the ratio of the hydraulic diameter of the third channels 18 to the hydraulic diameter of the first and second channels 16, 17 is less than 0.75. In some embodiments, the ratio may be less than 0.5 in order to provide an especially desirable improvement in heat transfer performance in certain applications.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the heat exchanger 1 illustrated in FIGS. 1-4 has an outer casing 2 within which the plurality of flow conduits 10 are located (and partially covered by one or more flow blocking plates 9, as described above), the exhaust gas inlet tank 3, the exhaust gas outlet tank 4, and the exhaust flow inlet and outlet ports 7, 8. It will be appreciated that in other applications, other configurations of the heat exchanger 1 are possible while still utilizing features of the present invention, such as heat exchangers having different shapes and sizes, heat exchangers having more than one exhaust gas inlet tank and/or outlet tank, and heat exchangers having more than one exhaust flow inlet ports and/or outlet ports. As another example, the heat exchanger 1 can have any number of flow blocking plates 9 desired, each of which can block fluid flow through the plurality of flow conduits 10.

Various features and advantages of the invention are set forth in the following claims.

The invention claimed is:

1. An exhaust gas recirculation cooler configured to cool exhaust gas from an engine, the exhaust gas recirculation cooler comprising:
   an inlet configured to receive the exhaust gas from the engine;
   an outlet configured to direct the exhaust gas back toward the engine;
   a coolant flow conduit;
   an exhaust gas flow conduit including
      a first end adjacent the inlet,
      a second end adjacent the outlet,
      a first narrow side,
      a second narrow side opposite the first narrow side,
      substantially flat broad sides extending between the first narrow side and the second narrow side,
      a first channel adjacent the first narrow side and extending between the first end and the second end,
      a second channel adjacent the second narrow side and extending between the first end and the second end, and
      a plurality of third channels located between the first channel and the second channel and extending between the first end and the second end; and
   a plate located at one of the first end and the second end of the exhaust gas flow conduit to inhibit the exhaust gas from flowing through at least one of the first channel and the second channel while allowing exhaust gas flow through the plurality of third channels.

2. The heat exchanger of claim 1, further comprising a header that receives a portion of the exhaust gas flow conduit, wherein the plate is directly coupled to the header.

3. The heat exchanger of claim 1, wherein the exhaust gas flow conduit includes a fin structure that divides the exhaust gas flow conduit into the plurality of third channels.

4. The heat exchanger of claim 1, wherein the first channel has a first hydraulic diameter, wherein the second channel has a second hydraulic diameter, and wherein at least one of the third channels has a third hydraulic diameter that is less than the first hydraulic diameter.

5. The heat exchange of claim 4, wherein the second hydraulic diameter is similar to the first hydraulic diameter.

6. The heat exchanger of claim 1, wherein the plate includes an aperture aligned with at least some of the plurality of third channels to allow exhaust gas to flow through the plurality of third channels.

7. The heat exchanger of claim 6, wherein the plate inhibits the exhaust gas from flowing through both the first channel and the second channel.

8. The heat exchanger of claim 1, wherein the plate includes a face and a surface offset from the face, and wherein the surface is received within the exhaust gas flow conduit adjacent the first narrow side to substantially block exhaust gas flow through the first channel.

9. The heat exchanger of claim 8, wherein the exhaust gas flow conduit includes a fin structure that divides the exhaust gas flow conduit into the plurality of third channels, and wherein the surface offset from the face contacts the fin structure.

10. The heat exchanger of claim 8, wherein the surface is a first surface, wherein the plate further includes a second surface offset from the face, and wherein the second surface is received within the exhaust gas flow conduit adjacent the second narrow side to substantially block exhaust gas flow through the second channel.

11. The heat exchanger of claim 1, wherein the first narrow side and the second narrow side of the exhaust gas flow conduit are arcuately shaped.

12. The heat exchanger of claim 1, wherein the exhaust gas flow conduit is one of a plurality of exhaust gas flow conduits, each of the plurality of exhaust gas flow conduits including,
   a first end adjacent the inlet,
   a second end adjacent the outlet,
   a first narrow side,
   a second narrow side opposite the first narrow side,
   substantially flat broad sides extending between the first narrow side and the second narrow side, a first channel adjacent the first narrow side and extending between the first end and the second end,
   a second channel adjacent the second narrow side and extending between the first end and the second end, and
   a plurality of third channels located between the first channel and the second channel and extending between the first end and the second end, and
wherein the plate is located at one of the first ends and the second ends of the plurality of exhaust gas flow conduits and extends between the plurality of exhaust gas flow conduits, the plate inhibiting exhaust gas from flowing through at least one of the first channel and the second channel of each exhaust gas flow conduit while allowing exhaust gas flow through the plurality of third channels of each exhaust gas flow conduit.

13. An exhaust gas recirculation cooler configured to cool exhaust gas from an engine, the heat exchanger comprising:
   an inlet configured to receive the exhaust gas from the engine;
   an outlet configured to direct the exhaust gas back toward the engine;
   a coolant flow conduit;
   an exhaust gas flow conduit including
      a first end adjacent the inlet,
      a second end adjacent the outlet,
      a first arcuately shaped side,
      a second arcuately shaped side opposite the first arcuately shaped side,
      substantially flat broad sides extending between the first arcuately shaped side and the second arcuately shaped side,
      a first channel adjacent the first arcuately shaped side and extending between the first end and the second end, the first channel having a first hydraulic diameter,
      a second channel adjacent the second arcuately shaped side and extending between the first end and the second end, the second channel having a second hydraulic diameter, and
      a plurality of third channels located between the first channel and the second channel, each of the third channels having a third hydraulic diameter, the third hydraulic diameter less than the first hydraulic diameter; and
   a plate located at one of the first end and the second end of the exhaust gas flow conduit to inhibit the exhaust gas from flowing through at least one of the first channel and the second channel while allowing exhaust gas flow through the plurality of third channels.

14. The heat exchanger of claim 13, further comprising a plurality of exhaust gas flow conduits similar to the exhaust gas flow conduit, wherein the plate inhibits the exhaust gas from flowing through at least one of the first channel and the second channel of each exhaust gas flow conduit while allowing exhaust gas flow through the plurality of third channels of each exhaust gas flow conduit.

15. The heat exchanger of claim 13, further comprising a header that receives a portion of the exhaust gas flow conduit, wherein the plate is directly coupled to the header.

16. The heat exchanger of claim 13, wherein a ratio of the third hydraulic diameter to the first hydraulic diameter is less than 0.75.

17. The heat exchanger of claim 13, wherein the ratio of the third hydraulic diameter to the first hydraulic diameter is about 0.4.

18. The heat exchanger of claim 13, wherein the second hydraulic diameter is similar to the first hydraulic diameter.

19. The heat exchanger of claim 13, wherein the plate includes an aperture aligned with at least some of the plurality of third channels to allow exhaust gas flow through the plurality of third channels.

20. The heat exchanger of claim 13, wherein the plate includes a face and a surface offset from the face, and wherein the surface is received within the exhaust gas conduit adjacent the first arcuately shaped side to substantially block exhaust gas flow through the first channel.

* * * * *